US009781596B2

(12) United States Patent
Toh

(10) Patent No.: US 9,781,596 B2
(45) Date of Patent: Oct. 3, 2017

(54) METHOD, APPARATUS AND SYSTEM FOR A MOBILE VIRTUAL NUMBER SERVICE IN A MOBILE TELECOMMUNICATIONS SYSTEM

(75) Inventor: Kok Liang Toh, Breda (NL)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 79 days.

(21) Appl. No.: 13/513,431

(22) PCT Filed: Dec. 10, 2009

(86) PCT No.: PCT/EP2009/066802
§ 371 (c)(1),
(2), (4) Date: Jun. 18, 2012

(87) PCT Pub. No.: WO2011/069544
PCT Pub. Date: Jun. 16, 2011

(65) Prior Publication Data
US 2012/0282896 A1    Nov. 8, 2012

(51) Int. Cl.
*H04W 40/00* (2009.01)
*H04W 8/26* (2009.01)
*H04W 8/04* (2009.01)
*H04W 8/08* (2009.01)

(52) U.S. Cl.
CPC ............... *H04W 8/26* (2013.01); *H04W 8/04* (2013.01); *H04W 8/08* (2013.01)

(58) Field of Classification Search
CPC ... H04M 3/42008; H04W 12/06; H04W 8/04; H04W 8/26
USPC ............ 455/411, 415, 417, 418, 435.1, 461; 379/211.01, 211.02, 212.01, 213.01
See application file for complete search history.

(56) References Cited

U.S. PATENT DOCUMENTS

| 6,163,606 | A  * | 12/2000 | Otto ......................... 379/211.02 |
| 6,327,353 | B1 * | 12/2001 | Fukuzawa et al. ...... 379/201.01 |
| 7,308,092 | B1 * | 12/2007 | Sun et al. ..................... 455/417 |
| 2007/0099638 | A1 * | 5/2007 | Voltz ............................. 455/500 |
| 2007/0105531 | A1 * | 5/2007 | Schroeder, Jr. ............... 455/411 |

(Continued)

FOREIGN PATENT DOCUMENTS

| WO | 03039182 A1 | 5/2003 |
| WO | 2009021555 A1 | 2/2009 |

OTHER PUBLICATIONS

3rd Generation Partnership Project. "Digital cellular telecommunications system (Phase 2+); Universal Mobile Telecommunications System (UMTS); Numbering, addressing and identification (3PPG TS 23.003 version 7.4.0 Release 7)." 3GPP Standards, European Telecommunications Standards Institute (ETSI) TS 123 003 V7.4.0; Jun. 2007; pp. 1-54; Sophia Antipolis Cedex, France.

*Primary Examiner* — Thai Vu
(74) *Attorney, Agent, or Firm* — Coats & Bennett, PLLC

(57) ABSTRACT

A method of and an engine for providing a Mobile Virtual Number, MVN, service in a node of a mobile telecommunications system comprising a plurality of nodes providing service to a plurality of mobile User Equipments, UEs. The MVN service instructs the telecommunications system for handling calls related to a first mobile subscriber number, corresponding to the mobile UE, and a second mobile subscriber number such that the mobile UE operates under the second mobile subscriber number.

13 Claims, 5 Drawing Sheets

(56) References Cited

U.S. PATENT DOCUMENTS

| | | | |
|---|---|---|---|
| 2008/0045186 A1* | 2/2008 | Black | H04L 29/06027 455/413 |
| 2008/0101582 A1 | 5/2008 | Hua et al. | |
| 2008/0152120 A1* | 6/2008 | Bugenhagen | 379/221.15 |
| 2010/0128857 A1* | 5/2010 | Logan | 455/456.1 |

* cited by examiner

METHOD, APPARATUS AND SYSTEM FOR A MOBILE VIRTUAL NUMBER SERVICE IN A MOBILE TELECOMMUNICATIONS SYSTEM

TECHNICAL FIELD

The present invention relates to call handling in a mobile telecommunications system and, more particularly, to call handling of a plurality of mobile subscriber numbers by a single mobile user equipment.

BACKGROUND

Within a mobile telecommunications system plural mobile User Equipment, UE, is active. Among which Mobile Telephones, Personal Digital Assistants, Mobile Personal Computers and many other communication devices. Each mobile UE comprises a Subscriber Identity Module, SIM, card comprising the Mobile Subscriber Integrated Service Digital Network, MSISDN, number. In the following called the mobile subscriber number. A mobile UE of a user can not operate without a physically attached SIM card. Without the SIM card in place there is no identification of the mobile subscriber number and neither is pre-paid or post-paid charging possible.

The physical presence of a SIM card with a mobile UE causes restrictions of the freedom of use of a mobile subscriber number of a user.

In a situation where two or more users want to share a same mobile UE, they can only do so by physically replacing the SIM card. Another situation wherein a single user owns two or even more mobile subscriber numbers and the user wants to use both mobile subscriber numbers on the same or on different devices, he or she has to swap SIM cards.

A possible solution to the problem of swapping SIM cards is to use a mobile UE which is capable of physically attaching two SIM cards, a so called dual SIM compatible mobile UE. Although this provides a solution to a single user owning a mobile UE and two SIM cards, there are serious restrictions. Only a few mobile UE available nowadays are compatible for using two SIM cards, therefore limiting the choice of using a particular mobile UE. Besides that dual SIM mobile UE are more expensive then single SIM mobile UE. This solution does also not apply for users who want to use more than two SIM cards.

SUMMARY

It is an object of the present invention to provide an easy to use solution for handling calls with a mobile UE with a plurality of mobile subscriber numbers without swapping the SIM card or making changes to the mobile UE or being restricted to the use of dual SIM compatible mobile UE.

A first aspect comprises a method of providing a Mobile Virtual Number, MVN, service in a node of a mobile telecommunications system comprising a plurality of nodes providing service to a plurality of mobile UE. The method comprises the steps of:
  receiving a logon request issued by a mobile UE, the logon request comprising a first mobile subscriber number associated with the mobile UE and a second mobile subscriber number, and
  instructing at least one node of the telecommunications system for handling calls related to the first and second mobile subscriber number such that the mobile UE operates under the second mobile subscriber number.

In prior art solutions a mobile UE can only operate and be applied for normal use if a SIM card with corresponding mobile subscriber number is i.e. physically attached to that mobile UE. Different from those prior art solutions the present aspect provides a service in a mobile telecommunications system such that a user can use his or her mobile subscriber number without the need of having a SIM card with his or her corresponding mobile subscriber number physically attached to the mobile UE.

An MVN service is introduced within a node of a mobile telecommunications system. The MVN service is initialised by a received logon request of a mobile UE. The logon request consists at least out of a first and second mobile subscriber number. The first mobile subscriber number is the number which corresponds to the SIM attached to the mobile UE. The second mobile subscriber number is a number supplied by a mobile telecommunications provider. This number however does not have to be restricted to a SIM card. It may for example only exist in the subscriber number registration system of the operator without a physical attached corresponding SIM card.

At the receipt of the logon request by the MVN service, the MVN service instructs by use of instructions and protocols of the mobile telecommunications system at least one node within that mobile telecommunications system responsible for call handling. The instruction causes all calls from and all calls to the first and second mobile subscriber number to be directed to the MVN service. When the instructions are set and a call to or from the first or second mobile subscriber number takes place, the call is addressed by this node to the MVN service which replaces the first mobile subscriber number with the second. Thereafter all calls from the mobile UE take place under the second instead of the first mobile subscriber number and all calls to the second mobile subscriber number will be addressed to the mobile UE corresponding to the first mobile subscriber number.

Another example of the first aspect comprises the steps of:
  receiving a registration request issued by a mobile UE, the registration request comprising the second mobile subscriber number and a password, and
  storing a combination of both the second mobile subscriber number and the password.

Registration allows the provider to select an exclusive group of mobile subscriber numbers to be users of the MVN service. With a registration step, the provider can select which mobile subscriber numbers are allowed to use the MVN service and which numbers are not, i.e. by using a white-list or a black-list in order to allow or deny certain mobile subscriber numbers.

In a further example the logon request comprises a password, wherein the second mobile subscriber number and the password of a received logon request is compared with a stored combination of a second mobile subscriber number and a password for operating the UE under the second mobile subscriber number if the received combination matches a stored combination of a second mobile subscriber number and a password.

By adding the condition of a password to the logon request a provider of mobile telecommunications services can increase the security level of the MVN service. When a third party tries to logon somebody else's mobile subscriber number to the MVN service, they have to provide a password equal to the password used at registration. The risk both passwords are different is very low, therefore minimising abuse.

In the previous examples the second mobile subscriber number is only active during logon to the MVN service.

When not using the MVN service the second mobile subscriber number remains available for use with a SIM corresponding to the second mobile subscriber number.

In another example of the invention the registration request initiates instructing at least one node of the telecommunications system for handling calls related to the second mobile subscriber number by the MVN service.

By instructing a node of the telecommunications system for handling calls related to the second mobile subscriber number by the MVN service during registration, the mobile subscriber number is in a permanent MVN mode. By introducing this step the operator is able to provide permanent MVN only mobile subscriber numbers.

In a further example there is an announcement provided for all calls related to the second mobile subscriber number if the second mobile subscriber number is not logged-on.

With this announcement third parties calling the second mobile subscriber number are informed of its unavailability. This announcement may comprise a congestion tone, a voice message or an other form of announcement.

In yet another example the following steps are added:
receiving a logout request issued by a mobile UE, and
instructing at least one node of the telecommunications system by the MVN service for handling calls related to the first and second mobile subscriber number such that the mobile UE operates under the first mobile subscriber number.

When the mobile subscriber number is operating under the MVN service by the registration only the provider can deactivate the mobile subscriber number operating under the MVN service.

By introducing a logout not only the operator of the mobile telecommunication system providing the MVN service, but also the user can decide when the mobile subscriber number is operating under the MVN service.

An other example comprises the steps of:
receiving a logout request after lapsing of a set time period,
instructing at least one node of the telecommunications system by the MVN service for handling calls related to the first and second mobile subscriber number such that the mobile UE operates under the first mobile subscriber number, and
forwarding a message to the mobile UE confirming logout.

For safety reasons and avoiding seizure of resources the mobile subscriber number operating under the MVN service will be logged out after a lapsing of a set time period (time-out). This way a mobile subscriber number active under the MVN service stops to operate under the MVN service after a set time period of non-use for example. In contrast with the previous example where the user itself initiated the logout, the logout in this example is initiated by use of a time-out function within, or external to the MVN service. Because the user is not aware of the forced logout, a message will be send to the mobile UE active under the MVN service, in order to inform the user of the time-out and resulting logout.

In an another example an announcement is provided for all calls related to the first mobile subscriber number if the mobile UE operates under the second mobile subscriber number.

During logon of the second mobile subscriber number with the MVN service the first mobile subscriber number can not be used. Third parties calling the first mobile subscriber number do not know the status of the first mobile subscriber number beforehand. An announcement will be provided during logon of the second mobile subscriber number within the MVN service, and therefore the non-usable first mobile subscriber number, to all calls related to the first mobile subscriber number. Third parties calling the first mobile subscriber number can herewith be informed and made aware of the temporary non-availability of the first mobile subscriber number.

In even another example the registration, logon and logout requests between a mobile UE and a MVN service are exchanged by means of any of a group comprising Unstructured Supplementary Service Data, USSD, Interactive Voice Response, IVR, and a Message Service, MS.

By making use of standardized and present communication means within mobile telecommunications systems, the implementation of an MVN service within such a mobile telecommunications system does not imply new protocols, adapted software in a mobile UE, adapted hardware of a mobile UE, adapted software within a node or adapted hardware of a node. Therefore making the implementation of the MVN service within an operative mobile telecommunications system easy and of low cost.

Yet another example comprises charging the second mobile subscriber number for calls handled by the mobile UE if the mobile UE operates under the second mobile subscriber number.

By introducing the step of charging the second mobile subscriber number during logon to the MVN service, the owner of the first mobile subscriber number will stay free of charge even when lending his or her mobile UE to the owner of the second mobile subscriber number this, however exclusively on the condition that the second mobile subscriber number is logged on to the MVN service. With this step all charging is up to the second mobile subscriber number.

In a second aspect there is provided an MVN engine for providing an MVN service in a node of a mobile telecommunications system comprising a plurality of nodes providing service to a plurality of mobile UE. The MVN engine comprises a receiving unit for receiving a logon request issued by a mobile UE. The logon request comprises a first mobile subscriber number associated with the mobile UE and a second mobile subscriber number, an instructing unit for instructing at least one node of the telecommunications system for handling calls related to the first and second mobile subscriber number such that the mobile UE operates under the second mobile subscriber number.

Such an MVN engine is applicable with mobile circuit switched telecommunications system networks or platforms supporting rich multimedia communications such as IP Multimedia Subsystems, IMS, wherein the service supports Session Initiation Protocol, SIP, signalling and the mobile UE operates as an IMS-based client, without modifying the existing network/platform.

In an example of the second aspect the receiving unit is arranged for receiving a registration request issued by a mobile UE. The registration request comprises the second mobile subscriber number and a password, and comprises a storage unit for storing a combination of both the second mobile subscriber number and a password.

In another example of the second aspect of the invention, the instructing unit is arranged for instructing at least one node of the telecommunications system for handling calls related to the second mobile subscriber number by the MVN service, and comprising an announcement unit for providing announcements for all calls related to the first mobile subscriber number if the mobile UE operates under the second mobile subscriber number and providing announcements for all calls related to the second mobile subscriber number if the second mobile subscriber number is not logged-on.

In yet another example of the second aspect of the invention, the receiving unit is arranged for receiving a logout request. And the instructing unit is arranged for instructing at least one node of the telecommunications system for handling calls related to the first and second mobile subscriber number such that the mobile UE operates under the first mobile subscriber number.

In a third aspect there is provided a mobile telecommunications system comprising a plurality of nodes and mobile UE. At least one node comprises an MVN engine for providing an MVN service to a plurality of mobile UE. The MVN engine comprises a receiving unit for receiving a logon request issued by a mobile UE. The logon request comprises a first mobile subscriber number associated with the mobile UE and a second mobile subscriber number. The MVN engine further comprises an instructing unit for instructing at least one node of the telecommunications system for handling calls related to the first and second mobile subscriber number such that the mobile UE operates under the second mobile subscriber number.

The above-mentioned and other features and advantages of the different aspects will be best understood from the following description referring to the attached drawings. In the drawings, like reference numerals denote identical parts or parts performing an identical or comparable function or operation.

DETAILED DESCRIPTION

The present invention will be illustrated by way of example and not by way of limitation in a mobile telecommunications system such as a Circuit Switched, CS, network, an IP Multimedia Subsystem, IMS, or other mobile telecommunications systems supporting mobile User Equipment, UE.

Figure 1:
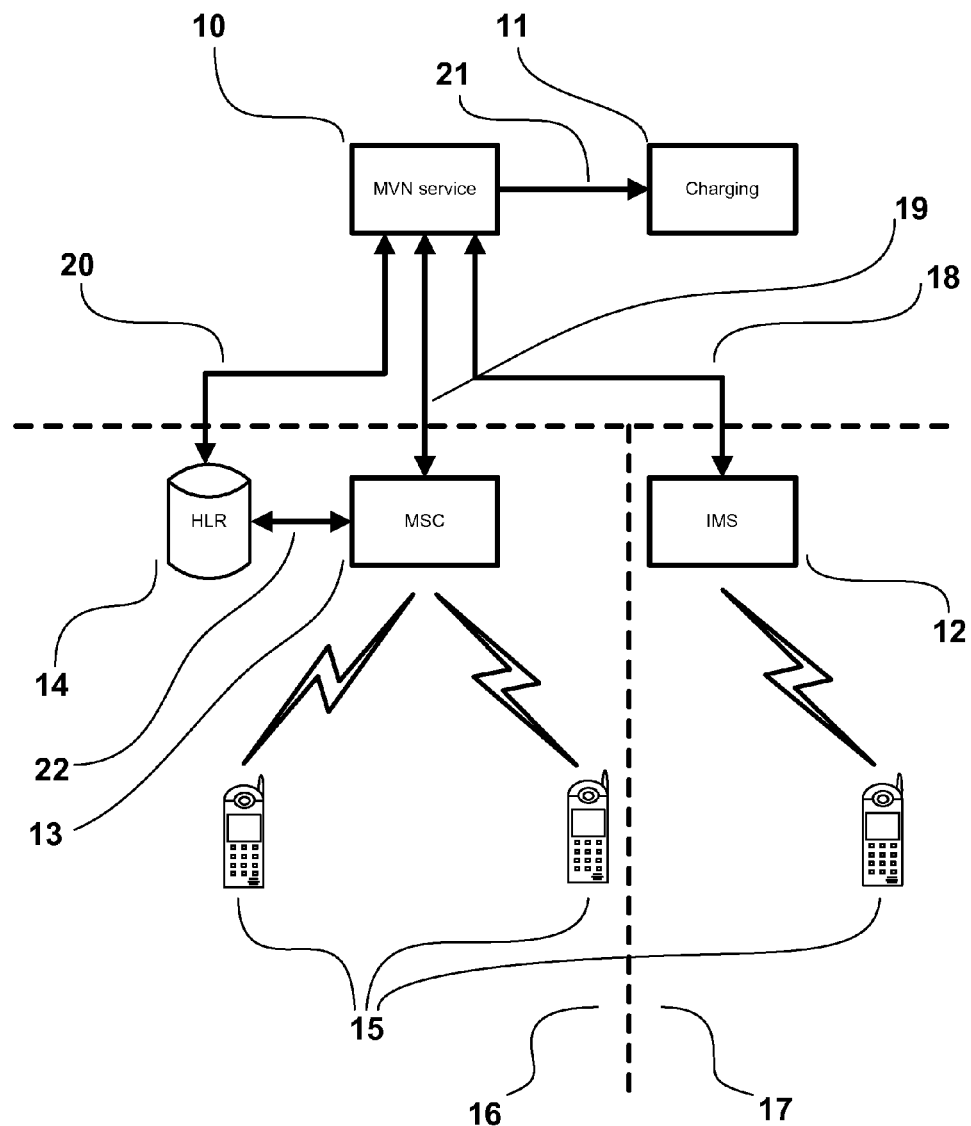
FIG. 1 shows, in a schematic and illustrative manner, an example of an MVN service operating with different mobile telecommunications technologies.

In FIG. 1, reference number 10 indicates a Mobile Virtual Number, MVN, service. The MVN service 10 communicates 19 with a Mobile Switching Centre, MSC, 13 which is the primary service delivery node of a mobile UE network, and responsible for handling calls, SMS as well as other services. The MSC 13 sets up and releases the end-to-end connection, handles mobility and hand-over requirements during the call. The MVN service 10 also communicates 20 with a Home Location Registration, HLR, 14. The HLR 14 is a central database that contains details of each mobile UE subscriber that is authorised to use the mobile telecommunications network. There can be several logical, and physical, HLRs per public land mobile telecommunications network. The HLR 14 communicates 22 with the MSC 13 directly. Mobile UEs 15 are wirelessly connected to the MSC 13 by several radio base stations and radio node controllers not shown. A telecommunications system may comprise a plurality of MSCs 13.

The telecommunications network shown in FIG. 1 operates as a CS network 16, and as an IMS network 17. In this example the MVN service 10 operates with both telecommunications technologies and can, as FIG. 1 shows, communicate 18 with an IMS node 12 of an IMS network.

The MVN service 10 can for example communicate 19 with the MSC 13 by use of the Camel Application Part, CAP, v2 protocol, or with the CS1+ protocol. The communication 18 with the IMS node 12 could for example be done using the Session Initiation Protocol, SIP, protocol.

FIG. 1 also shows a charging service 11 (pre-paid or post-paid) communicating 21 with the MVN service 10. The MVN service 10 can therefore charge the second mobile subscriber number for the calls made during operation of the second mobile subscriber number under the MVN service 10.

Figure 2:
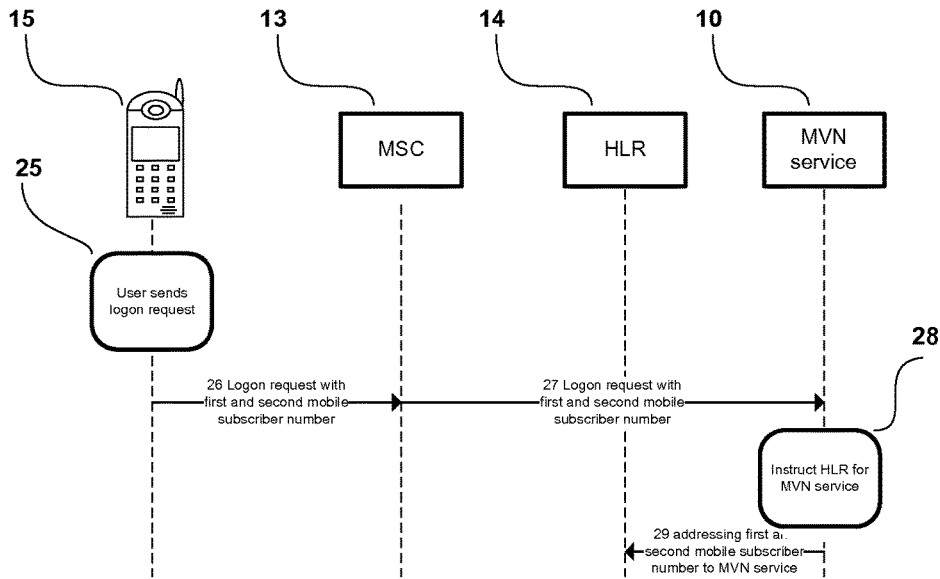
FIG. 2 illustrates a flow diagram with a logon request and corresponding instructions from the MVN service.

In FIG. 2 a user with a mobile UE 15 (a mobile phone in this example), wants to make use of the MVN service 10 and therefore sends a logon request 25. The logon request is send 26 to the MSC 13 by use of, for example, Unstructured Supplementary Service Data, USSD, an Interactive Voice Response, IVR, or other Message Service, MS. The logon request comprises at least a first mobile subscriber number being the Mobile Subscriber Integrated Services Digital Network, MSISDN number and a second mobile subscriber number, the number chosen to operate under the MVN service 10. The logon request is addressed to, and therefore send 27 to the MVN service 10. The MVN service 10 could then perform some optional checks, for example, if the second mobile subscriber number (which the user wants to operate under the MVN service 10) is allowed by the operator to be used under the MVN service 10. After this the MVN service 10 instructs 28 the HLR 14 to set 29 for example an O-CSI and T-CSI Man Machine Language, MML, command in the HLR, in case of a CAPv2 compatible mobile telecommunications system. By setting these MML commands the HLR is instructed to address the calls for which these MML commands are set to the MVN service 10.

Figure 3:
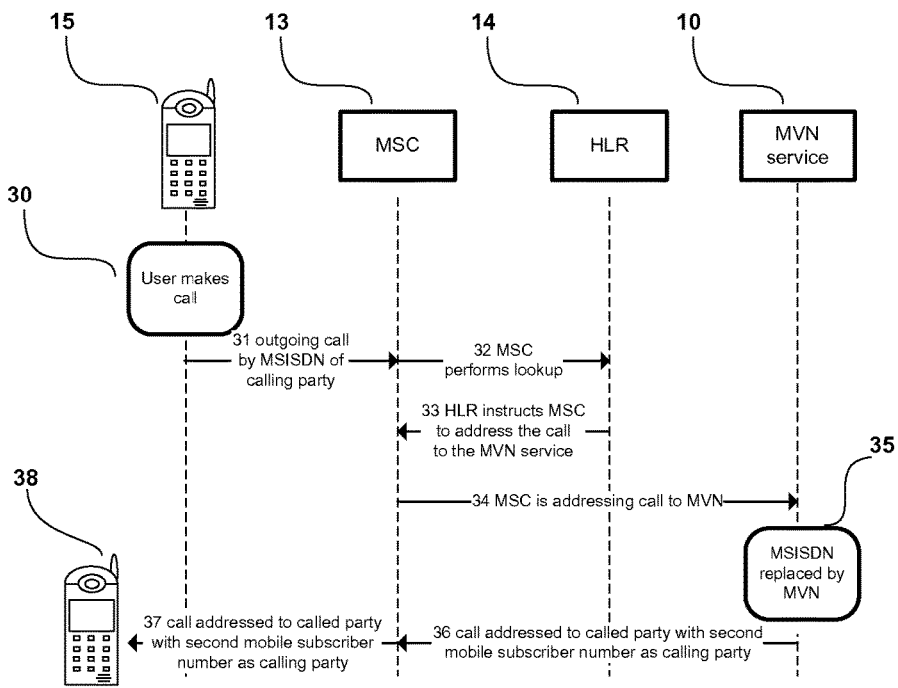
FIG. 3 illustrates a call flow diagram when a user performs an outgoing call.

In FIG. 3 the user is logged on to the MVN service 10 as already illustrated in FIG. 2. The user then makes a call 30 with the mobile UE 15 to a mobile UE 38 of a third party. The call is received 31 by the MSC 13. The MSC 13 performs a database lookup 32 of the MSISDN of the calling party in the HLR 14. Within the HLR 14 the O-CSI and T-CSI MML commands are set. The HLR therefore instructs 32 the MSC 13 to address 34 the call to the MVN service 10. The MVN service 10 replaces 35 the calling party identification MSISDN of the call by the second mobile number active under the MNV service and sends 36 the call back to the MSC 13 by which the mobile UE 38 of the third party is connected 37 via several radio base stations and radio node controllers not shown.

Figure 4:
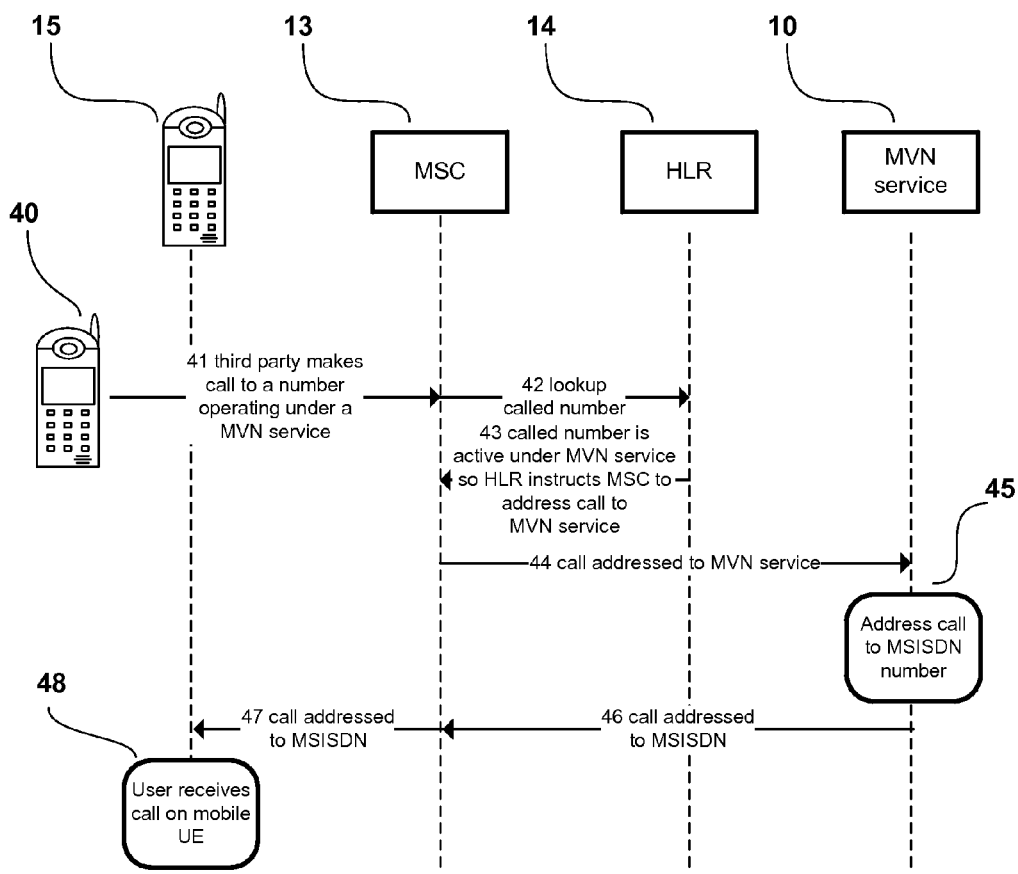
FIG. 4 illustrates a call flow diagram when a user receives an incoming call.

FIG. 4 illustrates a call flow when an MVN service user receives a call on the mobile UE 15. The mobile UE 40 of a third party tries to contact the mobile UE 15 of the user by making a call to the mobile subscriber number logged on under the MVN service 10. The third party call is received 41 by a MSC 13. The MSC 13 performs a lookup 42 of the MSISDN of the called party in the HLR 14. The HLR is instructs 43 the MSC 13 to address 44 the call to the to MVN service 10. The MVN service 10 is aware of the logon of the second mobile subscriber number under the MVN service 10 and knows the number can be reached at the mobile UE 15 of the user, therefore addressing 45 the call 46 to the MSC 13 on which the mobile UE 15 is connected via several radio base stations and radio node controllers not shown. The user receives 48 the call on the mobile UE 15 and the call takes place.

Figure 5:
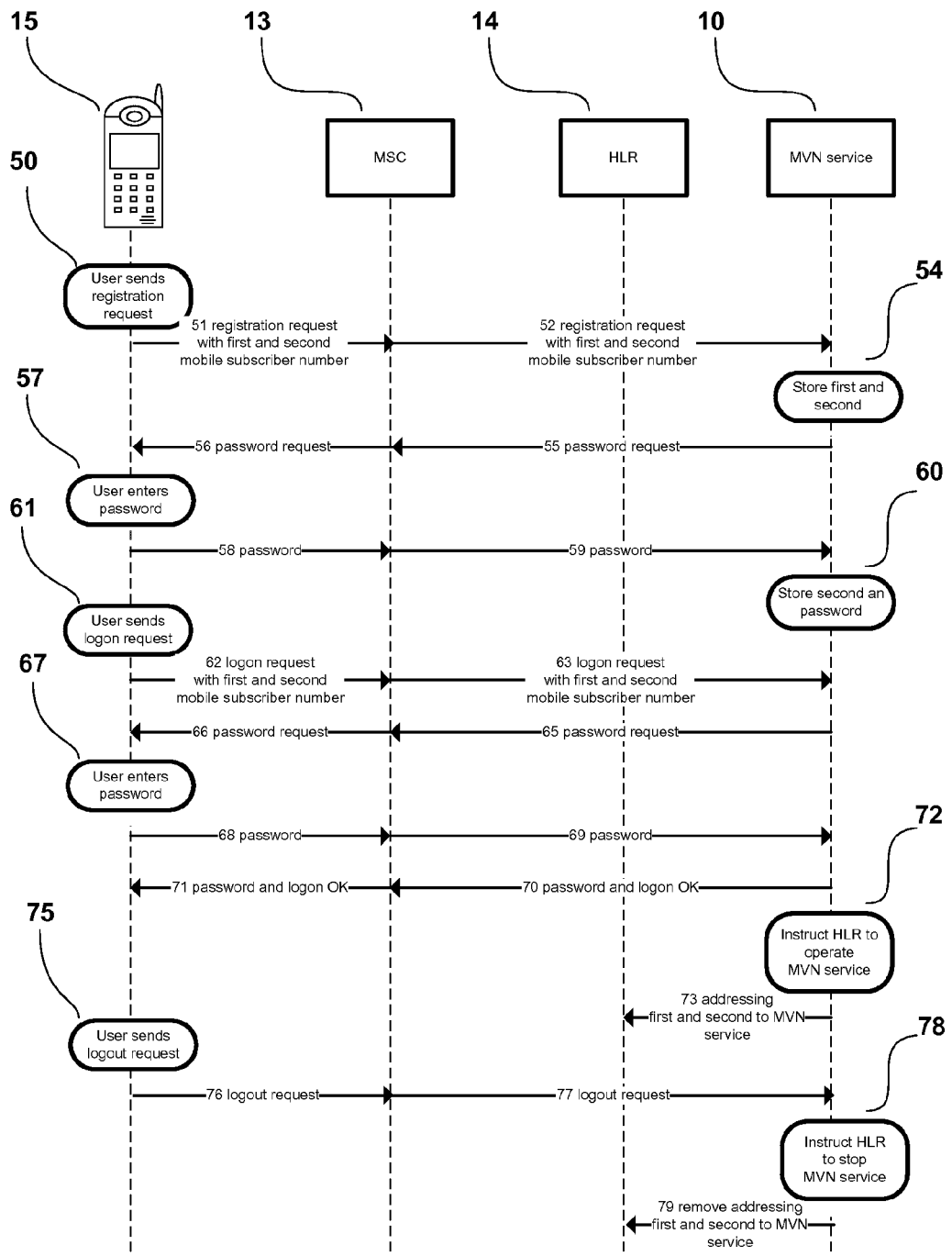
FIG. 5 illustrates a flow diagram with a registration request, a logon request and a logout request.

FIG. 5 illustrates an MVN service 10 comprising a registration step, a logon step and a logout step. The user sends a registration request 50 with a mobile UE 15. The request is received 51 by the MSC 13 by use of for example USSD, IVR or an MS. The logon request comprises at least a first mobile subscriber number corresponding to the mobile UE 15 of the user. This first mobile subscriber number would be the number the user uses under a non-operating MVN service 10. The registration request further comprises a second mobile subscriber number, which is the number the user wants to use under the MVN service 10. The MSC 13 addresses 52 the registration request to the MVN service 10. The MVN service 10 then stores 54 the first and second mobile subscriber number and sends back a password request 55, 56 to the mobile UE 15 connected by a MSC 13 via several radio base stations and radio node controllers. The user enters a password 57 which is returned 58 to the MSC 13 and addressed 59 to the MVN service 10. The MVN service 10 stores 60 the combination of the second mobile subscriber number and the password.

When a user wants to make use of the MVN service 10, he or she sends a logon request 61. The MSC 13 receives 62 the request which comprises at least a first and second mobile subscriber number. The logon request is addresses 63 to the MVN service 10. The MVN service 10 is aware of the stored combination of both second mobile subscriber number and password and sends back 65, 66 a password request to the mobile UE 15. The user then enters the password equal to the password entered during registration 67. The password is received 68, 69 by the MVN service 10 and the MVN service 10 then confirms 70, 71 the successful logon to the mobile UE 15. The MVN service 10 instructs 73 the HLR 14 to address all calls to the first and second mobile subscriber number to the MVN service 10.

The mobile UE now operates under the second mobile subscriber number, which now is logged on under the MVN service 10. The first mobile subscriber number which corresponds to the mobile UE 15 is during operating of the second mobile subscriber number under the MVN service 10, unavailable. All calls from and to the second mobile subscriber number are addressed to the mobile UE 15 of the corresponding first mobile subscriber number (MSISDN), therefore making it able to receive calls addressed to the second mobile subscriber number on the mobile UE 15 with the corresponding first mobile subscriber number and making outgoing calls with the mobile UE 15 as if a SIM card with the second mobile subscriber number was attached to the mobile UE 15.

If the user wants to stop using the MVN service 10, he or she can send a logout request 75. The logout request is received 76 by a MSC 13 and ongoing 77 by the MVN service 10. The MVN service 10 instructs 78 the HLR 79 to stop addressing both first and second mobile subscriber numbers to the MVN service 10. In case of a CAP v2 compatible telecommunications system this is done by removing the O-CSI and T-CSI MML. Therefore bringing back the original situation wherein the mobile UE operates under the first mobile subscriber number (MSISDN).

Figure 6:
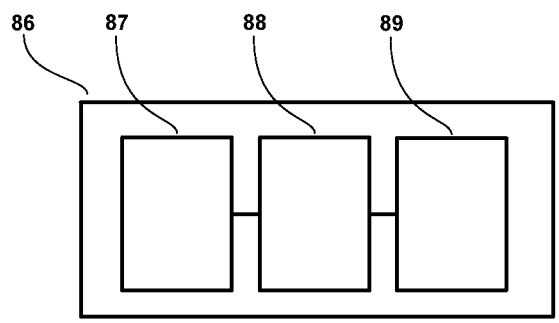
FIG. 6 shows, in a schematic and illustrative manner, an MVN engine and MVN service units.

FIG. 6 illustrates an MVN engine 86 comprising a receiving unit 87 for receiving logon requests, registration requests and logout requests. Furthermore the MVN engine 86 comprises an instructing unit 88 for instructing a node such as an MSC and HLR to address all calls from and to the first and second mobile subscriber numbers to the MVN engine 86. The MVN engine 86 also comprises an announcement unit 89. The announcement unit can make an announcement to all users calling the first mobile subscriber number during logon of the second mobile subscriber number to the MVN service. The announcement could be of different forms but not restricted to i.e. a congestion tone, a voice message or an other method of announcing. The announcement also makes an announcement to all users calling the second mobile subscriber number when the second mobile subscriber number is not logged on to the MVN service.

Figure 7:
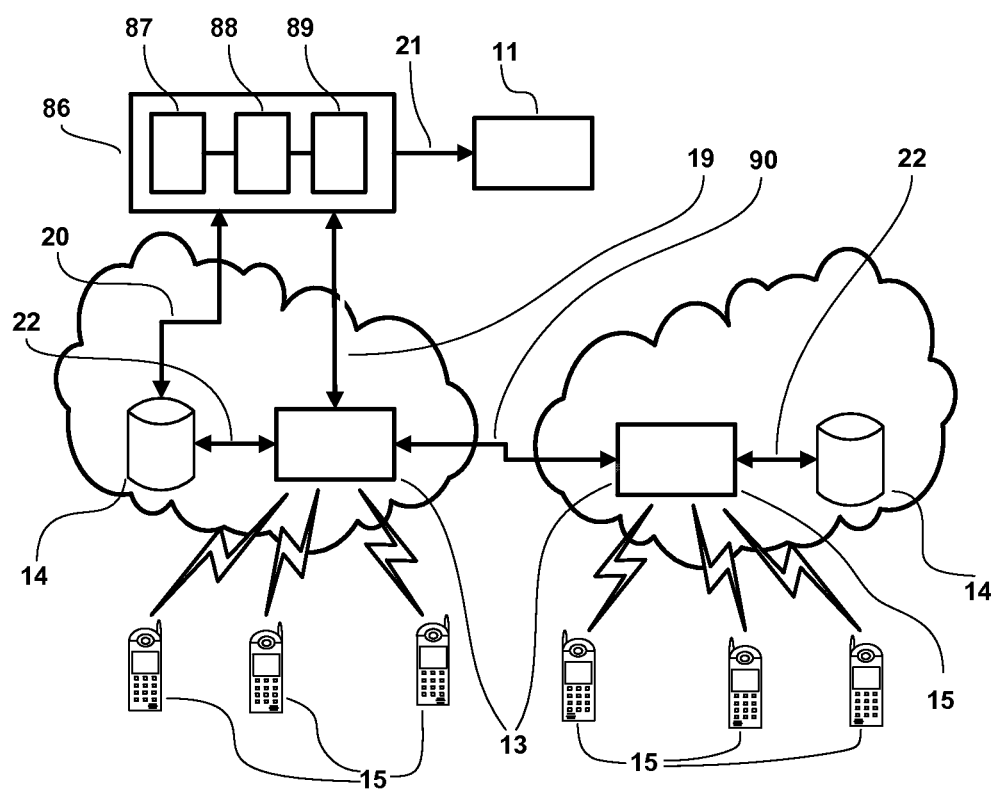
FIG. 7 shows, in a schematic and illustrative manner, a mobile telecommunications system with a node comprising an MVN engine.

FIG. 7 illustrates an MVN engine 86 comprising a receiving unit 87, an instructing unit 88 and an announcement unit 89 connected 21 to a charging system 11 for charging outgoing calls on the mobile UE during logon of the second mobile subscriber number to the MVN service. This figure illustrates different telecommunications technologies, both having an MSC 13 connected 22 with a HLR 13. Different via base stations and radio node controllers connected mobile UE 15 make wireless connections to the mobile telecommunications network via the MSC 13. Within the network the MVN service is connected 19 to an MVN engine 86 from the MSC 13 and a connection 15 from the HLR 14 to the MVN engine 86. The several units are arranged to operate in accordance with the method described above.

The present invention is not limited to the embodiments as disclosed above, and can be modified and enhanced by those skilled in the art beyond the scope of the present invention as disclosed in the appended claims without having to apply inventive skills.

The invention claimed is:

1. A method of providing a Mobile Virtual Number (MVN) service in a node of a mobile telecommunications system, the mobile telecommunications system comprising a plurality of nodes providing service to a plurality of mobile User Equipment (UE), the plurality of nodes including a Mobile Switching Center (MSC) and a separate Home Location Register (HLR), an MVN engine providing the MVN service connected to the MSC via a first connection and connected to the HLR via second connection independent of the first connection, the method comprising:
   receiving a logon request issued by a mobile UE, the logon request comprising a first Mobile Subscriber Integrated Service Digital Network (MSISDN) number corresponding to the mobile UE and a second MSISDN number;
   receiving a registration request issued by the mobile UE, the registration request comprising the second MSISDN number and a first password;
   storing a combination of both the second MSISDN number and the first password; and
   instructing at least one of the plurality of nodes of the telecommunications system for handling calls related to the first and second MSISDN numbers such that the mobile UE operates under the second MSISDN number by instructing, by the MVN service, the HLR to address the calls related to the first and second MSISDN numbers to the MVN service.

2. The method according to claim 1, further comprising:
   receiving a second password responsive to a second password request;

comparing the second MSISDN number and the second password with the stored combination of the second MSISDN number and the first password for operating the mobile UE under the second MSISDN.

3. The method according to claim 1, wherein the registration request initiates instructing the at least one of the plurality of nodes to handle calls related to the second MSISDN number by the MVN service.

4. The method according to claim 3, further comprising providing an announcement for all calls related to the second MSISDN number if the second MSISDN number is not logged-on.

5. The method according to claim 1, further comprising:
receiving a logout request issued by a mobile UE; and
instructing, by the MVN service, at least one of the plurality of nodes for handling calls related to the first and second MSISDN number after receipt of the logout request such that calls addressed to the mobile UE operate under the first MSISDN number by instructing, by the MVN service, the HLR to stop addressing the calls related to the first and second MSISDN numbers to the MVN service.

6. The method according to claim 1, further comprising:
receiving a logout request after expiration of a set time period;
instructing, by the MVN service, at least one of the plurality of nodes for handling calls related to the first and second MSISDN number after receipt of the logout request such that the mobile UE operates under the first MSISDN number by instructing, by the MVN service, the HLR to stop addressing the calls related to the first and second MSISDN numbers to the MVN service; and
forwarding a message to the mobile UE confirming logout.

7. The method according to claim 1, further comprising providing an announcement for all calls related to the first MSISDN indicating that the mobile UE operates under the second MSISDN number.

8. The method according to claim 1, wherein the registration request, the logon request, and a logout request between the mobile UE and the MVN service are exchanged by means of any of a group comprising Unstructured Supplementary Service Data (USSD), Interactive Voice Response (IVR), and a Message Service (MS).

9. The method according to claim 1, further comprising charging the second MSISDN number for calls handled by the mobile UE indicating that the mobile UE operates under the second MSISDN number.

10. A Mobile Virtual Number (MVN) engine for providing an MVN service in a node of a mobile telecommunications system, the mobile telecommunications system comprising a plurality of nodes providing service to a plurality of mobile User Equipment (UE), the plurality of nodes including a Mobile Switching Center (MSC) and a separate Home Location Register (HLR), the MVN engine connected to the MSC via a first connection and connected to the HLR via second connection independent of the first connection, the MVN engine comprising:
a receiver configured to receive a logon request issued by a mobile UE, the logon request comprising a first Mobile Subscriber Integrated Service Digital Network (MSISDN) number corresponding to the mobile UE and a second MSISDN number; and
an instructing circuit unit configured to instruct at least one of the plurality of nodes of the telecommunications system for handling calls related to the first and second MSISDN numbers such that the mobile UE operates under the second MSISDN number by instructing the HLR to address the calls related to the first and second MSISDN numbers to the MVN engine;
wherein the receiver is further configured to receive a registration request issued by the mobile UE, the registration request comprising the second MSISDN number and a password;
wherein the MVN engine further comprises a memory for storing a combination of both the second MSISDN number and the password.

11. The MVN engine according to claim 10:
wherein the instructing circuit is further configured to instruct the at least one of the plurality of nodes for handling calls related to the second MSISDN number by the MVN service;
the MVN engine further comprising an announcement unit configured to:
provide announcements for all calls related to the first MSISDN number if the mobile UE operates under the second MSISDN number;
provide announcements for all calls related to the second MSISDN number if the second MSISDN number is not logged-on.

12. The MVN engine according to claim 10:
wherein the receiver is further configured to receive a logout request; and
wherein the instructing circuit is further configured to instruct the at least one of the plurality of nodes for handling calls related to the first and second MSISDN number after receipt of the logout request such that the mobile UE operates under the first MSISDN number by instructing the HLR to stop addressing the calls related to the first and second MSISDN numbers to the MVN service.

13. A mobile telecommunications system comprising a plurality of nodes and a mobile User Equipment (UE), the plurality of nodes including a Mobile Switching Center (MSC) and a separate Home Location Register (HLR), at least one of the plurality of nodes comprising a Mobile Virtual Number (MVN) engine configured to provide an MVN service to a plurality of mobile UE, the MVN engine connected to the MSC via a first connection and connected to the HLR via second connection independent of the first connection, the MVN engine comprising:
a receiver configured to receive a logon request issued by a mobile UE, the logon request comprising a first Mobile Subscriber Integrated Service Digital Network (MSISDN) number associated with the mobile UE and a second MSISDN number; and
an instructing circuit configured to instruct at least one of the plurality of nodes for handling calls related to the first and second MSISDN number such that the mobile UE operates under the second MSISDN number by instructing the HLR to address the calls related to the first and second MSISDN numbers to the MVN engine;
wherein the receiver is further configured to receive a registration request issued by the mobile UE, the registration request comprising the second MSISDN number and a password;
wherein the MVN engine further comprises a memory for storing a combination of both the second MSISDN number and the password.

* * * * *